United States Patent
Fujino

(10) Patent No.: US 7,067,051 B2
(45) Date of Patent: Jun. 27, 2006

(54) PROCESS FOR PRODUCING CARBONIZED PRODUCT USED FOR PRODUCING ACTIVATED CARBON FOR ELECTRODE OF ELECTRIC DOUBLE-LAYER CAPACITOR, AND ORGANIC MATERIAL FOR CARBONIZED PRODUCT

(75) Inventor: Takeshi Fujino, Saitama (JP)

(73) Assignees: Honda Motor Co., Ltd, Tokyo (JP); Mitsubishi Gas Chemical Company, Inc., Tokyo (JP)

( * ) Notice: Subject to any disclaimer, the term of this patent is extended or adjusted under 35 U.S.C. 154(b) by 192 days.

(21) Appl. No.: 10/687,740

(22) Filed: Oct. 20, 2003

(65) Prior Publication Data

US 2004/0223899 A1    Nov. 11, 2004

(30) Foreign Application Priority Data

Oct. 22, 2002    (JP)    ............... 2002-307436

(51) Int. Cl.
  *C10C 1/00*    (2006.01)
(52) U.S. Cl. .................. 208/39; 423/447.6; 423/445 R
(58) Field of Classification Search ............. 423/447.6, 423/445 R; 502/416; 208/39
  See application file for complete search history.

(56) References Cited

U.S. PATENT DOCUMENTS 4,986,893 A * 1/1991 Seo et al. ................. 208/39

FOREIGN PATENT DOCUMENTS

JP    2002-93667    3/2002

* cited by examiner

*Primary Examiner*—Colleen P. Cooke
*Assistant Examiner*—Rebecca M. Stadler
(74) *Attorney, Agent, or Firm*—Arent Fox PLLC

(57) ABSTRACT

To produce a carbonized product used for producing activated carbon for en electrode of an electric double-layer capacitor, a condensed polycyclic aromatic pitch having an optical anisotropic rate Oa in a range of $1\% \leq Oa \leq 90\%$ and a softening point Ts in a range of $140° C. \leq Ts \leq 260° C.$ is subjected to an oxygen crosslinking treatment at a heating temperature Th set at $Th < 260° C.$ to provide an organic material for a carbonized product having a light component content L equal to or higher than 14.5% by weight, and the organic material is subjected to a carbonizing treatment at a temperature-raising rate Rt set at $Rt \geq 500° C./hr$ and at a heating temperature Th set in a range of $600° C. \leq Th \leq 1,000° C.$ for a heating time t set at $t \leq 2$ hr.

4 Claims, 1 Drawing Sheet

PROCESS FOR PRODUCING CARBONIZED PRODUCT USED FOR PRODUCING ACTIVATED CARBON FOR ELECTRODE OF ELECTRIC DOUBLE-LAYER CAPACITOR, AND ORGANIC MATERIAL FOR CARBONIZED PRODUCT

BACKGROUND OF THE INVENTION

1. Field of the Invention

The present invention relates to a process for producing a carbonized product used for producing activated carbon for an electrode of an electric double-layer capacitor, and to an organic material for the carbonized product.

2. Description of the Related Art

There is such a known process for producing a carbonized product, in which a mesophase pitch having an optical anisotropic rate Oa equal to 100% is subjected to a thermal treatment and then to carbonizing treatment, or subjected to an insolubilizing treatment and then to a carbonizing treatment (for example, see Japanese Patent application Laid-open No. 2002-93667, [0018] to [0020] and Table 1).

However, the activated carbon for the electrode produced using the carbonized product in the above-described conventional process suffers from a problem that its electrostatic capacity density (F/cc) varies widely, and it is difficult to stably produce activated carbon for an electrode having a high electrostatic capacity density (F/cc).

SUMMARY OF THE INVENTION

Accordingly, it is an object of the present invention to provide a process for producing a carbonized product which makes it possible to stably product activated carbon having a high electrostatic capacity density (F/cc) by subjecting a particular organic material for the carbonized product or by performing a particular carbonizing treatment.

to achieve the above object, according to the present invention, there is provided a process for producing a carbonized product used for producing activated carbon for an electrode of an electric double-layer capacitor, comprising the steps of subjecting a condensed polycyclic aromatic pitch having an optical anisotropic rate Oa in a range of $1\% \leq Oa \leq 90\%$ and a softening point Ts in a range of $140°$ C. $\leq Ts \leq 260°$ C. to an oxygen crosslinking treatment at a heating temperature Th set at Th<$260°$ C. to provide an organic material for a carbonized product having a light component content L equal to or larger than 14.5% by weight, and subjecting the organic material to a carbonizing treatment at a temperature-raising rate Rt set at Rt$\geq 500°$ C./h and at a heating temperature Th set in a range $600°$ C. $\leq Th \leq 1,000°$ C. for a heating time t set at t$\leq 2$ hr.

A condensed polycyclic aromatic pitch having a low softening point Ts as described above has an undeveloped optical anisotropic phase and a relatively small average molecular weight, and has a relatively large content of light components (components having low boiling points). An organic material produced by subjecting the condensed polycyclic aromatic pitch to an oxygen crosslinking treatment at the above-described heating temperature Th, has a characteristic that the intrinsic object of the oxygen crosslinking treatment can be achieved, and the development of graphitization in the carbonizing treatment can be suppressed. In addition, at the heating temperature Th the advance of the dehydrogenation of light components and naphthene ring contained in the condensed polycyclic aromatic pitch is also suppressed, so that a non-mesophase state of the pitch is maintained.

However, when a condensed polycyclic aromatic pitch having a softening point Ts lower than $140°$ C. or higher than $260°$ C. is used, it is impossible to eventually produce an excellent activated carbon. This also applies to a case where the light component content L is lower than 14.5% by weight. Also, when the heating temperature Th is equal to or higher than $260°$ C., the dehydrogenation advances and as a result, the characteristic of the condensed polycyclic aromatic pitch is lost.

When such an organic material is subjected to a carbonizing treatment at a high temperature-raising rate at a high temperature for a short time, the dehydrogenating reaction of the light components and the naphthene ring can be caused to hinder the advance of mesophasing and to form a large number of fine pores. The condensed polycyclic aromatic pitch has an undeveloped optical anisotropic phase and a relatively small average molecular weight, so that the condensation reaction of the organic ring caused by the carbonizing treatment is small, and the molecular weight is not increased. Further, the development of carbon crystallites is uniform, whereby a carbonized product having a high density can be produced.

However, when the temperature-raising rate Rt is lower than $500°$ C./hr, the mesophasing of the organic material advances. When the heating temperature Th is lower than $600°$ C., a sufficient carbonizing treatment cannot be conducted, and when the heating temperature Th is higher than $1,000°$ C., an alkali activating treatment after the carbonizing treatment does not advance. Further, when the heating time t is shorter than 2 hours, a sufficient carbonizing treatment cannot be conducted, and when the heating time t is longer than 2 hours, the dehydrogenation excessively advances, so that the contraction of particles of the carbonized product occurs to cause the disappearance of fine pores.

When the carbonized product is subjected to an alkali activating treatment, the fine pores are uniformly widened, to thereby stably produce an activated carbon for an electrode having a high electrostatic capacity density (F/cc).

The above and other objects, features and advantages of the invention will become apparent from the following description of the preferred embodiment taken in conjunction with the accompanying drawing.

DESCRIPTION OF THE PREFERRED EMBODIMENT

Figure 1:
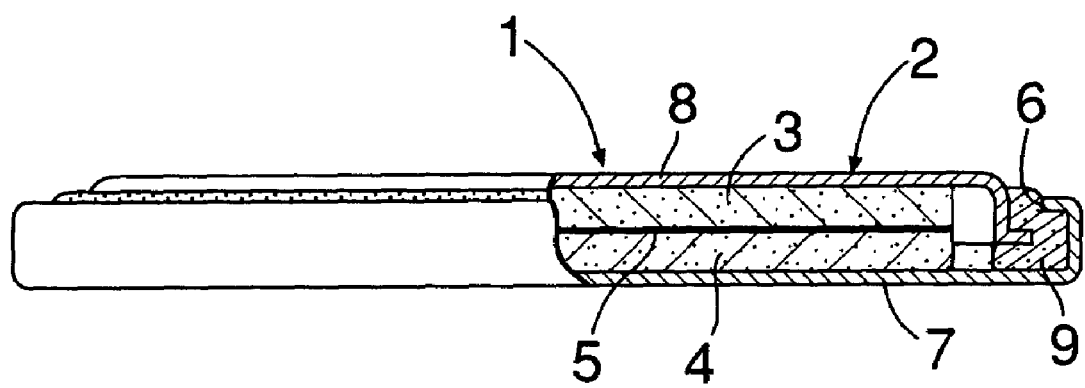
FIG. 1 is a broken-away from view of essential portions of a button-shaped electric double-layer capacitor.

The present invention will now be described by way of a preferred embodiment with reference to the accompanying drawings.

Referring first to FIG. 1, a button-shaped electric double-layer capacitor 1 includes a case 2, a pair of polarized electrodes 3 and 4 accommodated in the case, a spacer 5 interposed between the polarized electrodes 3 and 4, and an electrolytic solution charged into the case 2. The case 2 comprises a body 7 made of aluminum and having an opening 6, and a lid plate 8 made of aluminum and closing the opening 6. A space between an outer periphery of the lid plate 8 and an inner periphery of the body 7 is seated by a seal material 9. Each of the polarized electrodes 3 and 4 is formed of a mixture of activated carbon for the electrode, a conductive filler and a binder.

The activated carbon for the electrode is produced by sequentially carrying out: a step of subjecting a starting carbon material to an oxygen crosslinking treatment to provide an organic material for a carbonized product; a step of subjecting the organic material to a carbonizing treatment to provide a carbonized product; a step of subjecting the carbonized product to a pulverizing treatment; a step of subjecting the pulverized carbonized product to an alkali activating treatment; and steps of washing, filtering and drying treatments to provide an activated carbon.

Used as the starting carbon material is a condensed polycyclic aromatic pitch which is a graphitizing carbon material and which has a softening point Ts in a range of 140° C.$\leq$Ts$\leq$260° C. The condensed polycyclic aromatic pitch has an optical anisotropy rate Os in a range of 1%$\leq$Os$\leq$90%, preferably Oa<50%. If the optical anisotropy rate Os is deviated from this requirement, it is not preferred for increasing the electrostatic capacity density (F/cc) of the activated carbon for the electrode. The condensed polycyclic aromatic pitch may be a chemically synthesized pitch, or a pitch produced from a petroleum pitch or a coal pitch. However, the pitch produced from the petroleum pitch and the like contains impurities in a content of 1,000 ppm or more. The impurities include large amounts of N and S, and other metal impurities such as Al, Si, V, Mg, Na and Ca. The increased amount of the impurities is not preferred, because they exhibit activating points during the alkali activating treatment to affect the distribution of pores in the activated carbon for the electrode after the activation, or they remain in the activated carbon for the electrode to react, thereby causing a reduction in capacity of the electrode double-layer capacitor, generation of gas, an increase in resistance and the like. It is preferable that the amount of the impurities, excepting C, O, H and S, is equal to or smaller than 100 ppm. To pulverize the starting carbon material, a ball mill, a jet mill, a highspeed rotary mill or the like is used.

The oxygen crosslinking treatment is carried out to crosslink together benzene rings of the adjacent condensed polycyclic organic compounds via oxygen in the condensed polycyclic aromatic pitch. An element ratio H/C of the organic material produced by the oxygen crosslinking treatment is larger than 0.38, desirably, equal to or larger than 0.63 (H/C$\geq$0.68). In this case, the organic material has a high element ratio H/C and causes a melt foaming, and a so-called insolubilizing effect is not provided by the oxygen crossliking treatment, but it is possible to provide such an activating effect that the interlaminar distance $d_{002}$ between carbon crystallities is increased by the oxygen crosslinking treatment to enhance the permeability to KOH.

An oxygen crosslinking rate $D_L$ is varied depending on the molecular structure of the starting carbon material, and is represented by $DL=[1+\{(W_2-W_1)/W_1\}]\times100$ (%), wherein $W_1$ represents a weight of the condensed polycyclic aromatic pitch before being oxygen crosslinked, and $W_2$ represents a weight of the organic material. The oxygen crosslinking rate $D_L$ is set in a range of 100.01%$\leq$DL$\leq$10%. In this case, even if the treatment is carried out at an oxygen crosslinking rate as low as $D_L$ equal to 100.01%, effects of decreasing the activation variation and the resistance of the electric double-layer capacitor are provided. However, if $D_L$<100.01%, the meaning of carrying out the oxygen crosslinking is lost. On the other hand, if $D_L$>106%, a reduction in productivity of the activated carbon for the electrode is brought about. To achieve the oxygen crosslinking rate $D_L$ in the above-described range, the crosslinking treatment is carried out in an oxygen at a heating temperature Th set in a range of 150° C.$\leq$Th<260° C. for a heating time t set in a range of $10^{-3}$ hr$\leq$t$\leq$10 hr. The heating temperature Th is determined based on the softening point Ts of the starting carbon material. The oxygen crosslinking treatment may be carried out at a single stage or at a plurality of stages. A high-molecular weight substance produced from $P_2O_5$, quinone, hydroquinone and a hydroquinone derivative, and $NO_2$ may be used as the crosslinking agent.

The carbonizing treatment is carried out in an inert gas at a heating temperature Th set in a range of 500° C.$\leq$Th$\leq$1,000° C. for a heating time t set at t$\leq$2 hr. In this case, especially, a hydrogenating reaction of a light component and a naphthene ring is caused by increasing the temperature-raising rate in the process of raising temperature and by conducting the carbonizing treatment at a high temperature for a short time, thereby hindering the advance of the mesophasing and forming a large number of fine pores. The organic material and thus the condensed polycyclic aromatic pitch has an undeveloped optical anisotropic phase and a relative small average molecular weight, so that the condensation reaction of an organic ring caused by the carbonizing treatment is small, and the molecular weight is not increased and further, the development of carbon crystallites is uniform. Thus, a carbonized product having a high density can be produced. The temperature-raising rate Rt is set at Rt$\leq$500° C./hr, preferably, Rt$\geq$700° C./hr.

In the carbonized product produced by the carbonizing treatment, an interlaminar distance $d_{002}$ between the carbon crystallites is in a range of 3.40 nm$\leq d_{002}\leq$0.350 nm, and a true density d is in a range of 1.3 g/cc$\leq$d$\leq$2.0 g/cc. Further, an element ratio H/C is in a range of 0.1$\leq$H/C$\leq$0.35.

In the pulverizing treatment, a pulverizer such as a ball mill, a jet mill, a high-speed rotary mill or the like is used. The particle size of the powdery carbonized product is set in a rage of 1 $\mu$m$\leq$Dm$\leq$50 $\mu$m in terms of a median diameter D. The efficiency of the alkali activating treatment can be enhanced by carrying out such particle-size regularization.

KOH is used as a treating agent in the alkali activating treatment for the powdery carbonized product, which is carried out in an inert gas atmosphere at a heating temperature Th set in a range of 500° C.$\leq$Th<900°0 C. for a treating time t set in a range of $10^{-3}$ hr$\leq$t$\leq$10 hr. In the alkali activating treatment, a heating treatment may be carried out at a heating temperature Th set in a range of 400° C.$\leq$Th<450° C. for a treating time t set in a range of $10^{-1}$ hr$\leq$t$\leq$10 hr for the purpose of dehydration at a preliminary stage. Thus, an activated carbon having a specific surface area of 800 m$^2$ or less measured by a nitrogen gas adsorption process and a pore volume of 0.25 cc/g or less is produced.

Specific examples will be described below.

(Starting Carbon Material)

Table 1 shows the optical anisotropic rate Oa and the softening point Ts in examples (1) to (5) of condensed polycyclic aromatic pitches and a commercially available mesophase pitch.

TABLE 1

| Starting carbon material | Optical anisotropic rate Oa (%) | Softening point Ts (° C.) |
|---|---|---|
| Example (1) | 4 | 170 |
| Example (2) | 8 | 190 |
| Example (3) | 49 | 220 |
| Example (4) | 90 | 260 |

TABLE 1-continued

| Starting carbon material | Optical anisotropic rate Oa (%) | Softening point Ts (° C.) |
|---|---|---|
| Example (5) | 100 | 285 |
| Example (6): Commercially available pitch | 75 | 290 |

In Table 1, each of the examples (1) to (5) is a chemically synthesized pitch, while the commercially available pitch is a pitch produced from a petroleum pitch and manufactured under a trade name of MPM-BO by Advanced Chemicals Corporation. The optical anisotropic rate Oa was determined as follows: each of the examples (1) to (6) was shot under a crossed nicol by a polarization microscope; and an area rate of an optical anisotropic phase of the sample in the photograph was calculated and determined as an optical anisotropic rate Oa.

(Production of Activated Carbon for Electrode)

(a) A starting massive carbon material comprising 10 g of the example (1) was pulverized by a laboratory cutter mill to provide a powdery carbon material having an average particle size of about 0.5 mm. (b) The powdery carbon material was spread on an upper surface of a retaining plate within an oven so that it readily contacts oxygen. Then, air was supplied at 10 L/min into the oven, and the powdery carbon material was subjected to an oxygen crosslinking treatment at a temperature-raising rate of 1° C./min, and it was retained at 130° C. for 3 hours and at 170° C. for 3 hours, thereby providing a powdery organic material. Thereafter, an oxygen crosslinking rate $D_L$ was determined for the powder organic material, resulting in $D_L$ equal to 100.05%. (c) The powdery organic material was placed into a carbonizing furnace, where it was subjected to a carbonizing treatment in a nitrogen gas current at a temperature-raising rate of 900° C./hr and it was retained at 700° C. for 1 hour, thereby providing a carbonized product. (d) The carbonized product was subjected to a pulverizing treatment using a laboratory cutter mill to provide a powdery carbonized product having a medium diameter Dm equal to 21 μm. (e) 2.5 grams of the carbonized product and an amount of KOH pellet having a weight twice of that of the carbonized product and a purity of 95%, were mixed together sufficiently, and the mixture was then charged into a boat made of Ni. (f) the boat was placed into a tubular furnace, where it was heated at a temperature-raising rate of 200° C./hr, and retained at 450° C. for 3 hours and then at 800° C. for 3 hours. Next, the boat was taken out of the tubular furnace, and the treated powder was subjected to HCl washing and warm water washing to remove KOH therefrom, and to the filtration and drying to provide an activated carbon for an electrode having an average particle size of 15 μm. The activated carbon for the electrode made in this manner is referred to as the example (1) for convenience.

Examples (2) to (5) and an example (6) of the activated carbons for an electrode were produced in the same manner, using starting massive carbon materials each comprising the examples (2) to (5) and the commercially available pitch. The examples (2) to (5) and the example (6) corresponding to the examples (2) to (5) and the commercially available pitch of starting carbon materials, respectively.

Using starting massive carbon materials comprising the examples (2) and (4) were used as examples $(2_1)$ and $(4_1)$, examples $(2_1)$ and $(4_1)$ of the activated carbons for electrodes corresponding to the examples $(2_1)$ and $(4_1)$ were produced in the same manner, except that the oxygen crosslinking treatment was carried out at the temperature-raising rate of 2° C./min, and the examples were retained at 250° C. for 3 hours and then at 300° C. for 3 hours.

Table 2 shows the oxygen cross-linking treatment conditions and oxygen crosslinking rate $D_L$ for the examples (1) to (5) of the starting carbon material, the example (6) of the commercially available mesophase pitch, and the examples $(2_1)$ and $(4_1)$.

TABLE 2

| Starting carbon material | Oxygen crosslinking treatment Conditions | Oxygen crosslinking rate $D_L$ (%) |
|---|---|---|
| Example (1) | 1° C./min | 100.05 |
| Example (2) | 140° C. for 3 hours | 100.11 |
| Example (3) | 170° C. for 3 hours | 100.20 |
| Example (4) |  | 100.25 |
| Example (5) |  | 100.25 |
| Example (6): Commercially available pitch |  | 100.15 |
| Example $(2_1)$ | 2° C./min | 106.4 |
| Example $(4_1)$ | 250° C. for 3 hours 300° C. for 3 hours | 106.5 |

Table 3 shows the element ratio H/C of the organic material and the carbonized product, the rate Wc of change in weight due to the dehydrogenation, the carbonization yield Cy and the content L of light components in the organic material for the oxygen crosslinking treatment for the examples (1) to (5) of the starting carbon material, the example (6) of the commercially available mesophase pitch, and the examples $(2_1)$ and $(4_1)$.

TABLE 3

| Starting carbon material | H/C Organic substance | H/C Carbonized product | Rate Wc of change in weight (% by weight) | Carbonization yield Cy (wt %) | Content L of light components in organic material (wt %) |
|---|---|---|---|---|---|
| Example (1) | 0.73 | 0.23 | 96.1 | 70 | 26.1 |
| Example (2) | 0.73 | 0.23 | 96.1 | 73 | 23.1 |
| Example (3) | 0.67 | 0.21 | 96.4 | 80 | 16.4 |
| Example (4) | 0.65 | 0.21 | 96.5 | 82 | 14.5 |
| Example (5) | 0.63 | 0.21 | 96.7 | 86 | 10.7 |
| Example (6) | 0.38 | 0.20 | 98.5 | 90 | 8.5 |

TABLE 3-continued

| Starting carbon material | H/C Organic substance | H/C Carbonized product | Rate Wc of change in weight (% by weight) | Carbonization yield Cy (wt %) | Content L of light components in organic material (wt %) |
|---|---|---|---|---|---|
| Commercially available pitch | | | | | |
| Example ($2_1$) | 0.73 | 0.23 | 96.1 | 84 | 12.4 |
| Example ($4_1$) | 0.65 | 0.21 | 96.5 | 85 | 11.5 |

The element ratio H/C was determined in the following manner: a specimen sampled from the example (1) or the like was subjected to a vacuum drying treatment at a temperature lower than its melting point for 3 hours; then, about 1.5 mg of the specimen was then subjected to the analysis of H and C using CHN coder MT-5 type analyzer manufactured by Yanagimoto; and about 3 mg of the specimen was subjected to the analysis of O using a CHN coder MT-3 type analyzer manufactured by Yanagimoto. N=2 or more at the time when the result of the analysis reached C+H+O<98%, was adopted as a data.

The rate Wc of change in weight was determined in the following manner: For example, in the example (1), because the element ratio H/C of the organic material is equal to 0.73, the weight ratio H/C is represented by H/C=(0.73×1)/(1×12)=0.73/12, and the weight H+C of the organic material is equal to 12.73 g. On the other hand, because the element ratio H/C of the carbonized product is equal to 0.23, the weight ratio H+C is represented by H/C=(0.23×1)/(1×12)=0.23/12, and the weight of the carbonized product is equal to 12.23 g. The rate Wc of change in weight is represented by Wc=(12.23/12.73)×100≈96.1% by weight. In this case, the carbonization yield Cy is 70% by weight, and the content L of light components in the organic material is represented by L=96.1−70=26.1% by weight, because the carbonization yield Cy is determined according to Cy=($W_3/W_2$)×100 (%) from the weight $W_2$ of the organic material and the weight $W_3$ of the carbonized product.

(Production of Button-shaped Electric Double-layer Capacitor)

The example (1) of the activated carbon for the electrode, a graphite powder (a conductive filler) and PTFE (a binder) were weighed so that a weight ratio was 90:5:5. Then, the weighed materials were kneaded together and then subjected to a rolling to fabricate an electrode sheet having a thickness of 185 μm. Two polarized electrodes each having a diameter of 20 mm were cut off from the electrode sheet, and a button-shaped electric double-layer capacitor 1 shown in FIG. 1 was fabricated using the two polarized electrodes, a spacer 5 made of PTFE and having a diameter of 20 mm and a thickness of 75 μm, an electrolytic solution and the like. A solution of 1.8 M triethylmethyl ammonium tetrafluoroborate [$(C_2H_5)_3CH_3NBF_4$] in propylene carbonate was used as the electrolytic solution. Seven button-shaped electric double-layer capacitors were fabricated in the same process using the examples (2) to (6), ($2_1$) and ($4_1$).

[Electrostatic Capacity Density (F/cc) of Activated Carbon for Electrode]

Each of the electric double-layer capacitors was subjected to a charging/discharging cycle which will be described below, and an electrostatic capacity density (F/cc) per unit volume of each of the electric double-layer capacitors was then determined in an energy conversion method. In the charging/discharging cycle, a process comprising charging for 90 minutes and discharging for 90 minutes was conducted once at 27 V, once at 2.8 V and once at 2.7 V.

Table 4 shows the electrode density and the electrostatic capacity density (F/cc) at 2.7 V for the examples (1) to ($4_1$) of the activated carbon for the electrode.

TABLE 4

| Activated carbon of electrode | Starting carbon material | Electrode density (g/cc) | Electrostatic capacity density (F/cc) |
|---|---|---|---|
| Example (1) | Example (1) | 1.07 | 41.7 |
| Example (2) | Example (2) | 0.95 | 38.1 |
| Example (3) | Example (3) | 1.06 | 37.5 |
| Example (4) | Example (4) | 1.06 | 36.0 |
| Example (5) | Example (5) | 0.90 | 32.5 |
| Example (6) | Example (6): Commercially available mesophase carbon | 0.88 | 31.0 |
| Example($2_1$) | Example ($2_1$) | 1.13 | 28.6 |
| Example($4_1$) | Example ($4_1$) | 0.88 | 32.5 |

As apparent from Tables 1 to 4, the activated carbon for the electrode having a high electrostatic capacity density (F/cc) at a low voltage can be produced, if the carbonized product is used which is produced as follows: each of the examples (1) to (4) of the condensed polycyclic aromatic pitches having an optical anisotropic rate Oa in a range of 1%≦Oa≦90% and a softening point Ts in a range of 140° C.≦Ts≦260° C. is subjected to the oxygen crosslinking treatment at a heating temperature Th set at Th<260° C. to thereby provide the organic material having a content L of light components equal to or larger than 14.5% by weight; and the organic material is subjected to the carbonizing treatment at a temperature-raising rate Rt set at Rt≦500° C./hr at a heating temperature Th set in a range of 600° C.≦Th≦1,000° C. for a heating time t set at t≦2 hr. The electrostatic capacity density of each of the examples (5) and (6) of the activated carbon for the electrode is lower as compared with the examples (1) to (4), because the softening point Ts of the condensed polycyclic aromatic pitch is higher than 260° C. in the case of the example (5) of the activated carbon for the electrode and because the commercially available mesophase pitch is used as the starting carbon material in the case of the example (6) of the activated carbon for the electrode. Further, even when the example ($2_1$) and ($4_1$) of the condensed polycyclic aromatic pitches having the lower softening point Ts as in the case of the example ($2_1$) and ($4_1$) of the activated carbons for the electrodes are used, if the heating temperature Th in the oxygen crosslinking treatment is set at Th>260° C., the electrostatic capacity density (F/cc) is low as compared with the examples (2) and (4) of the activated carbons for the electrodes.

If the examples (1) to (3) of the activated carbons for the electrodes are compared with the example (4) of the activated carbon for the electrode, it is considered that a condensed polycyclic aromatic pitch having an optical anisotropic rate Oa smaller than 50% is preferred to a condensed polycyclic aromatic pitch having an optical anisotropic rate Oa equal to or larger than 50%, in order to enhance the electrostatic capacity density (F/cc).

What is claimed is:

1. A process for producing a carbonized product used for producing activated carbon for an electrode of an electric double-layer capacitor, comprising the steps of subjecting a condensed polycyclic aromatic pitch having an optical anisotropic rate Oa in a range of $1\% \leq Oa \leq 90\%$ and a softening point Ts in a range of $140°$ C.$\leq Ts \leq 260°$ C. to an oxygen crosslinking treatment at a heating temperature Th set at Th$\leq 260°$ C. to provide an organic material for a carbonized product having a light component content L equal to or larger than 14.5% by weight, and subjecting the organic material to a carbonizing treatment at a temperature-raising rate Rt set at R4$\leq 500°$ C./h and at a heating temperature Th set in a range $600°$ C.$\leq Th \leq 1,000°$ C. for a heating time t set at t$\leq 2$ hr.

2. An organic material for a carbonized product used for producing activated carbon for an electrode of an electric double-layer capacitor, which is produced by subjecting a condensed polycyclic aromatic pitch having an optical anisotropic rate Oa in a range of $1\% \leq Oa \leq 90\%$ and a softening point Ts in a range of $140°$ C.$\leq Ts \leq 260°$ C. to an oxygen crosslinking treatment at a heating temperature Th set at Th<$260°$ C., and which has a light component content L equal to or hither than 14.5% by weight.

3. An organic material for a carbonized product according to claim 2, wherein said condensed polycyclic aromatic pitch has an optical anisotropic rate Oa lower than 50%.

4. The process of claim 1, wherein the oxygen crosslinking treatment is carried out in an oxygen current.

* * * * *